US00RE50751E

(19) United States
(12) Reissued Patent
Jaquish et al.

(10) Patent Number: US RE50,751 E
(45) Date of Reissued Patent: Jan. 20, 2026

(54) EXERCISE APPARATUS

(71) Applicant: Jaquish Biomedical Corporation, Nevada City, CA (US)

(72) Inventors: John Paul Jaquish, Nevada City, CA (US); Paul Edward Jaquish, Nevada City, CA (US); Henry David Alkire, Nevada City, CA (US)

(73) Assignee: Jaquish Biomedical Corporation, Nevada City, CA (US)

(21) Appl. No.: 29/995,002

(22) Filed: Mar. 24, 2025

Related U.S. Patent Documents

Reissue of:
(64) Patent No.: Des. 958,386
Issued: Jul. 19, 2022
Appl. No.: 29/730,897
Filed: Apr. 9, 2020

U.S. Applications:
(63) Continuation of application No. 29/681,204, filed on Feb. 22, 2019, now Pat. No. Des. 914,113.

(51) LOC (15) Cl. ..... 21-02
(52) U.S. Cl.
USPC ..... D21/694
(58) Field of Classification Search
USPC ..... D21/662, 679, 673, 682, 686, 694; D8/367, 376; D7/513, 514
CPC ..... A63B 21/072; A63B 21/0724; A63B 21/0728; A63B 1/00; A63B 21/0023; A63B 21/0601; A63B 21/015
See application file for complete search history.

(56) References Cited

U.S. PATENT DOCUMENTS 825,955 A 7/1906 Bohache
1,019,861 A 3/1912 Titus
3,117,781 A 1/1964 Vargo
3,193,288 A 7/1965 Veil
3,256,015 A 6/1966 Perrin
3,785,644 A 1/1974 Bradley
3,910,573 A 10/1975 Jamba
4,200,281 A 4/1980 Wang
4,257,592 A 3/1981 Jones
D263,327 S 3/1982 Cooper
4,441,707 A 4/1984 Bosch
D274,539 S 7/1984 Bankier
D287,283 S * 12/1986 Johnson ..... E04F 11/0201 182/228.1
D289,538 S 4/1987 Wilson
D309,933 S 8/1990 Brown, Jr.
D320,428 S 10/1991 Rust
D330,057 S 10/1992 Saunders
D330,234 S 10/1992 Saunders
D330,235 S 10/1992 Traetta
5,154,678 A 10/1992 Adamczyk
5,178,596 A 1/1993 McIntire
5,197,934 A 3/1993 Wirtz
5,213,554 A 5/1993 Goldstein
D337,362 S 7/1993 Goldstein
5,226,865 A 7/1993 Chin
D339,179 S 9/1993 Wilkinson
D339,619 S 9/1993 Bugnaski
D342,298 S 12/1993 Schnabel, Jr.
D342,771 S 12/1993 Tandberg
D349,540 S 8/1994 Hand
D353,419 S 12/1994 Sprague
D353,637 S 12/1994 Huang
5,472,390 A 12/1995 Faye
D365,861 S 1/1996 Moss, Jr.
D369,627 S 5/1996 Thor
5,514,058 A 5/1996 Buoni
D371,176 S 6/1996 Furner
5,540,642 A 7/1996 Sprague
5,645,511 A 7/1997 Le Roux
5,653,665 A 8/1997 Neeley
5,688,213 A 11/1997 Recker
5,746,687 A 5/1998 Vial
5,776,041 A 7/1998 Fisher
5,885,196 A 3/1999 Gvoich
D408,555 S 4/1999 Albrecht
6,203,476 B1 3/2001 Wang et al.
6,280,366 B1 8/2001 Hsieh
D474,818 S 5/2003 Yu
D482,748 S 11/2003 Flynt
D495,379 S 8/2004 Dubus
D519,172 S 4/2006 Penat
7,052,449 B2 5/2006 Chen
D526,367 S 8/2006 Loccarini
7,175,574 B2 2/2007 Carmel et al.
D542,867 S 5/2007 Teruo
D556,841 S 12/2007 Oates (New)

| | | | | |
|---|---|---|---|---|
| D564,604 | S | 3/2008 | Mikail | |
| 7,387,599 | B1 | 6/2008 | Hsu | |
| D576,435 | S | 9/2008 | Snell | |
| D583,883 | S | 12/2008 | Thomas | |
| D590,457 | S | 4/2009 | Mishan | |
| 7,578,775 | B2 | 8/2009 | Terry | |
| 7,601,101 | B2 | 10/2009 | Jackson | |
| D604,374 | S | 11/2009 | Bizzell | |
| D610,638 | S | 2/2010 | Friess | |
| D626,607 | S | 11/2010 | Kim | |
| D633,155 | S | 2/2011 | Brun | |
| 7,922,624 | B1 | 4/2011 | Fairhurst | |
| 8,033,964 | B1 | 10/2011 | Chen | |
| D655,356 | S | 3/2012 | Sandman | |
| D657,008 | S | 4/2012 | Markovic | |
| D661,526 | S | 6/2012 | Evans | |
| D670,345 | S | 11/2012 | Guarrasi | |
| D680,599 | S | 4/2013 | Orenstein | |
| D681,138 | S | 4/2013 | Hodgkins | |
| D681,750 | S | 5/2013 | Meyer-Hayoz | |
| D682,374 | S | 5/2013 | Wilkinson | |
| D694,348 | S | 11/2013 | Rankin | |
| D695,367 | S | 12/2013 | Lovegrove | |
| 8,870,722 | B2 | 10/2014 | Kassel | |
| D717,381 | S | 11/2014 | Orenstein | |
| D723,637 | S | 3/2015 | Mercado | |
| D724,163 | S | 3/2015 | Kelley | |
| D733,226 | S | 6/2015 | Abbate | |
| D739,481 | S | 9/2015 | Glickfield | |
| D748,744 | S | 2/2016 | Hansen | |
| D748,745 | S | 2/2016 | Hansen | |
| 9,254,405 | B1 | 2/2016 | Black Marji | |
| D764,607 | S | 8/2016 | Beckford | |
| D778,374 | S | 2/2017 | Jaquish | |
| D785,106 | S | 4/2017 | Panes | |
| D785,731 | S | 5/2017 | Stack | |
| D798,396 | S | 9/2017 | Agate | |
| D802,153 | S | 11/2017 | Kelly | |
| D804,590 | S | 12/2017 | Hillson | |
| D806,806 | S | 1/2018 | Chen | |
| D825,696 | S * | 8/2018 | Mercenari Uribe | D21/671 |
| D825,697 | S | 8/2018 | Mercenari Uribe | |
| D834,115 | S | 11/2018 | Gilbert | |
| D842,940 | S | 3/2019 | Harden | |
| D849,857 | S | 5/2019 | Tartell | |
| D853,505 | S | 7/2019 | Toueg | |
| D854,635 | S | 7/2019 | Dunahay | |
| D855,718 | S | 8/2019 | Hsu | |
| D864,316 | S | 10/2019 | Brown | |
| D865,084 | S | 10/2019 | Croxton | |
| D874,585 | S | 2/2020 | Pellegrino | |
| D875,194 | S | 2/2020 | Zhou | |
| 10,744,363 | B1 * | 8/2020 | Jaquish | A61H 23/0263 |
| D895,739 | S | 9/2020 | Jaquish | |
| D898,133 | S | 10/2020 | Jaquish | |
| D902,329 | S | 11/2020 | Jaquish | |
| D902,330 | S | 11/2020 | Jaquish | |
| D902,834 | S | 11/2020 | Kern | |
| D914,113 | S | 3/2021 | Jaquish | |
| D914,114 | S | 3/2021 | Jaquish | |
| D919,019 | S * | 5/2021 | Jaquish | D21/679 |
| D921,134 | S * | 6/2021 | Jaquish | D21/686 |
| D925,666 | S * | 7/2021 | Jaquish | D21/679 |
| D937,369 | S | 11/2021 | Jaquish | |
| D954,858 | S | 6/2022 | Karvandi | |
| D977,043 | S | 1/2023 | Gu | |
| 11,701,539 | B2 | 7/2023 | Jaquish | |
| D994,054 | S | 8/2023 | Xu | |
| D1,001,623 | S | 10/2023 | Yegenoglu | |
| D1,030,919 | S | 6/2024 | Jaquish | |
| D1,043,171 | S | 9/2024 | Potter | |
| 2002/0137609 | A1 | 9/2002 | Rosati | |
| 2005/0101453 | A1 | 5/2005 | Jeneve | |
| 2005/0113222 | A1 | 5/2005 | Dovner | |
| 2005/0239617 | A1 | 10/2005 | Tenaglia | |
| 2006/0019779 | A1 | 1/2006 | Fritzke | |
| 2006/0128540 | A1 | 6/2006 | Engle | |
| 2007/0207903 | A1 | 9/2007 | Csabai | |
| 2007/0207905 | A1 | 9/2007 | Winston | |
| 2008/0287272 | A1 | 11/2008 | Luckadue | |
| 2009/0093349 | A1 | 4/2009 | Cooper | |
| 2010/0227747 | A1 | 9/2010 | Cook | |
| 2010/0255966 | A1 | 10/2010 | Aucamp | |
| 2011/0152042 | A1 | 6/2011 | Anderson | |
| 2011/0207583 | A1 | 8/2011 | Elpers | |
| 2011/0256987 | A1 | 10/2011 | Lepore | |
| 2014/0228180 | A1 | 8/2014 | Walker | |
| 2014/0336019 | A1 | 11/2014 | Villella | |
| 2015/0133276 | A1 | 5/2015 | Kaye | |
| 2015/0367159 | A1 | 12/2015 | Harris | |
| 2016/0038781 | A1 | 2/2016 | Christie | |
| 2016/0199689 | A1 | 7/2016 | Irwin | |
| 2017/0021219 | A1 | 1/2017 | Kelly | |
| 2017/0080284 | A1 | 3/2017 | Hillson | |
| 2017/0209730 | A1 | 7/2017 | Sise | |
| 2018/0125746 | A1 | 5/2018 | Kokakis | |
| 2018/0236299 | A1 | 8/2018 | Warriner | |
| 2019/0069650 | A1 | 3/2019 | Walker | |
| 2019/0217147 | A1 | 7/2019 | Garcia | |
| 2020/0054917 | A1 | 2/2020 | Lin | |

FOREIGN PATENT DOCUMENTS

| | | |
|---|---|---|
| EP | 2764896 A1 | 8/2014 |
| KR | 10200000 | 5/2000 |

OTHER PUBLICATIONS

Jaquishbiomedical, "X Bar Elite", Apr. 20, 2020. https://www.jaquishbiomedical.com/products/. Shown on p. 1. (Year 2020).

Redge Portable Gym System https://www.getredge.com/products/redge-portable-gym-system? (Year: 2022).

Youtube, "Introducing the GHAccelerator", Nov. 12, 2018. https://www.youtube.com/watch?v=IL-CahGcpOl. Shown at the 2:00 minute mark. (Year: 2018).

International Design Application No. 35/001,051, filed Jul. 17, 2015.

U.S. Appl. No. 29/515,595, filed May 7, 2020, now U.S. Design Pat. No. D. 778,374.

U.S. Appl. No. 29/733,956, filed May 7, 2020.

U.S. Appl. No. 29/733,965, filed May 7, 2020.

U.S. Appl. No. 29/734,014, filed May 8, 2020.

U.S. Appl. No. 29/734,015, filed May 8, 2020.

U.S. Appl. No. 29/734,055, filed May 8, 2020.

U.S. Appl. No. 29/734,056, filed May 8, 2020.

U.S. Appl. No. 29/734,057, filed May 8, 2020.

U.S. Appl. No. 29/734,091, filed May 8, 2020.

U.S. Appl. No. 29/734,092, filed May 8, 2020.

U.S. Appl. No. 29/681,204, filed Feb. 22, 2019.

U.S. Appl. No. 29/721,688, filed Jan. 22, 2020.

U.S. Appl. No. 29/721,690, filed Jan. 22, 2020.

U.S. Appl. No. 29/730,874, filed Apr. 9, 2020.

U.S. Appl. No. 29/730,876, filed Apr. 9, 2020.

U.S. Appl. No. 29/712,411, filed Nov. 7, 2019.

Jaquishbiomedical, "GH Accelerator", Nov. 13, 2019. https://www.jaquishbionnedical.conn/products/gh-accelerator/#reviews. Shown on p. 1. (Year: 2019).

Youtube,"Introducing the GHAccelerator", Nov. 12, 2018. https://www.youtube.com/watch?v=IL-CahGcpOI. Shown at the 2:00 minute mark. (Year: 2018).

GoFit bar, announced 2016 [online], [site visited May 3, 2021]. Available on internet:https://www.amazon.com/Go Fit-RAB-Resistnnce-Traini ng-Bar/dp/B01MTM7 N97/ref=sr 131?dchild=1&keywords=execise+bar+wilh+hook&qid=1619657583&s=sporting-goods&sr=1-31 (Year: 2016).

* cited by examiner

*Primary Examiner* — Philip S Hyder
(74) *Attorney, Agent, or Firm* — MORGAN, LEWIS & BOCKIUS LLP

(57) CLAIM

The ornamental design for an exercise apparatus, as shown and described.

DESCRIPTION

[FIG. 1 is a perspective view of an exercise apparatus showing our new design;]
[FIG. 2 is a front view of the design of FIG. 1, wherein the opposite side of the exercise apparatus is a mirror image of the front side;]
[FIG. 3 is a top view of the design of FIG. 1;]
[FIG. 4 is a bottom view of the design of FIG. 1; and,]
[FIG. 5 is a side view of the design of FIG. 1, wherein the opposite side of the exercise apparatus is a mirror image of the side view.]
[The band is shown with a symbolic break in its length. The appearance of any portion of the article beyond the break lines forms no part of the claimed design.]
*FIG. 6 is a perspective view of an exercise apparatus showing our new design;*
*FIG. 7 is a front view of the design of FIG. 6;*
*FIG. 8 is a rear view of the design of FIG. 6;*
*FIG. 9 is a top view of the design of FIG. 6;*
*FIG. 10 is a bottom view of the design of FIG. 6; and,*
*FIG. 11 is a side view of the design of FIG. 6, wherein the opposite side of the exercise apparatus is a mirror image of the side view.*
The broken lines shown in the Figures are for the purposes of illustrating portions of the exercise apparatus which form no part of the claimed design.

1 Claim, 6 Drawing Sheets

Matter enclosed in heavy brackets [ ] appears in the original patent but forms no part of this reissue; matter printed in italics indicates the additions made by reissue.

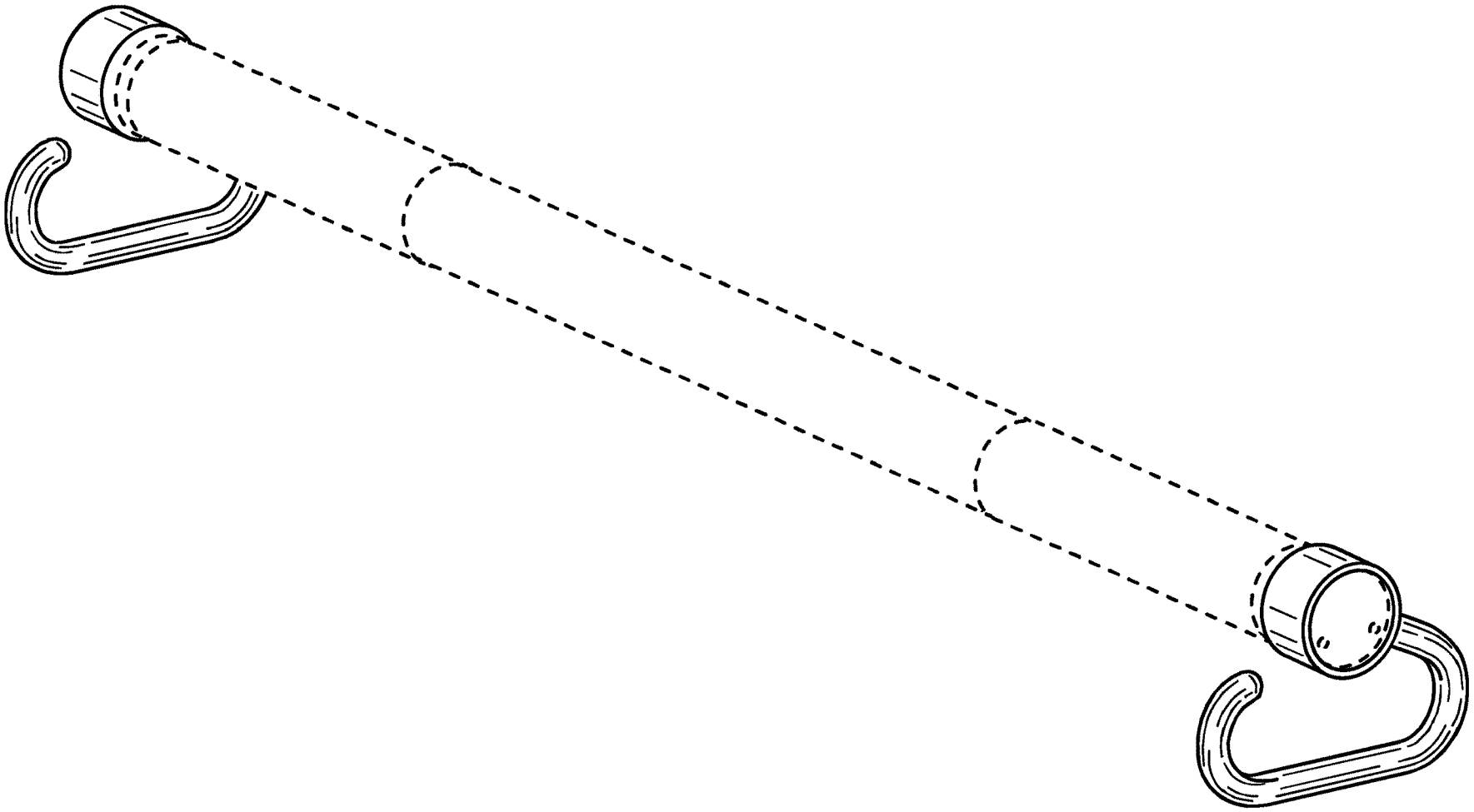
FIG. 6
(New)

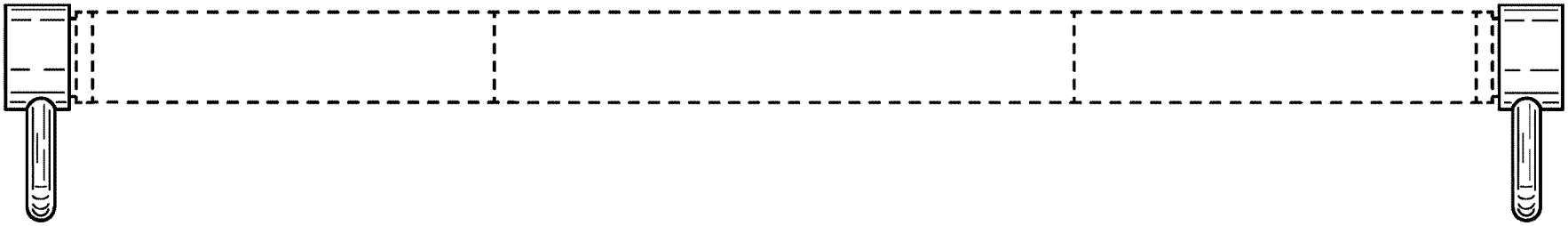
FIG. 7
(New)

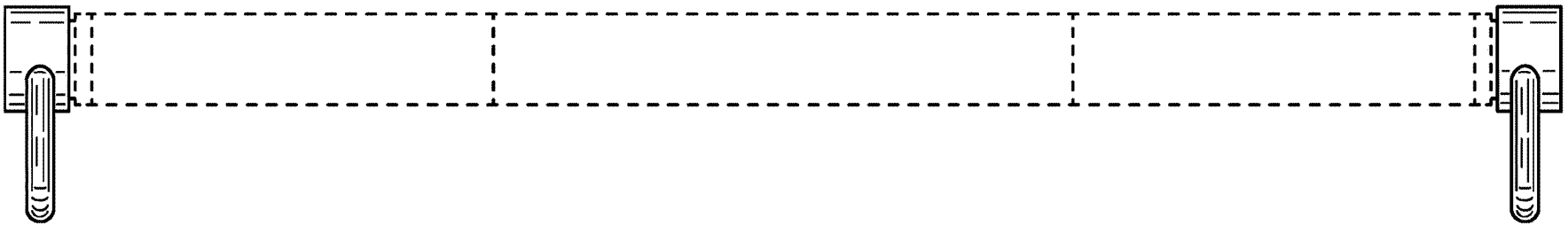
FIG. 8
(New)

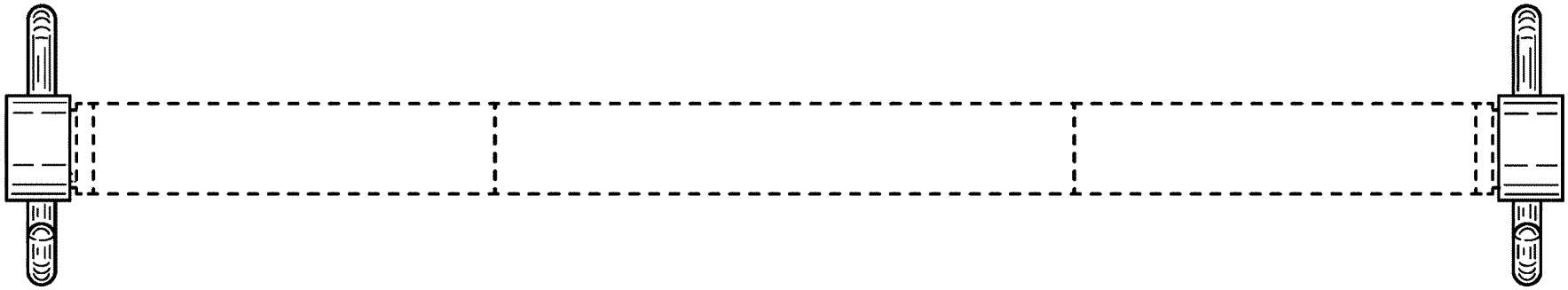
FIG. 9
(New)

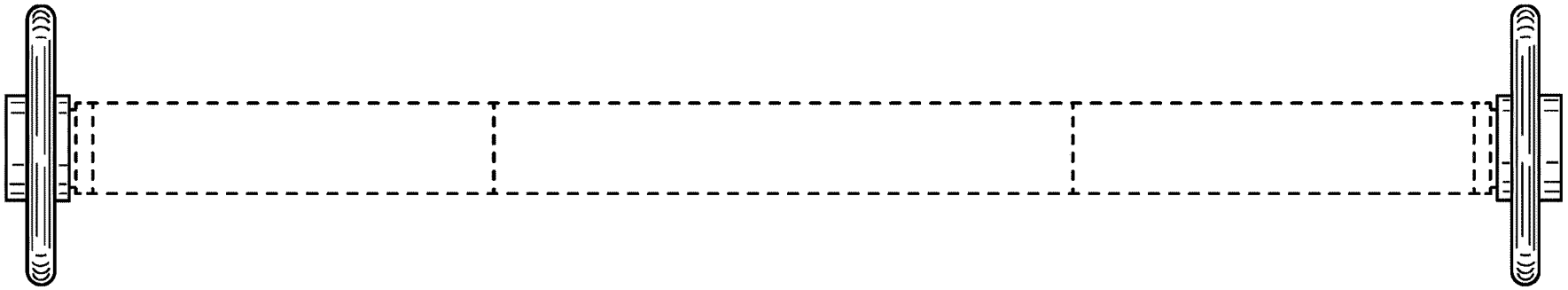
FIG. 10
(New)

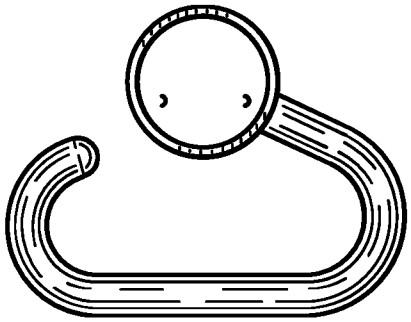
FIG. 11
(New)